United States Patent
Chen

(10) Patent No.: US 8,091,906 B1
(45) Date of Patent: Jan. 10, 2012

(54) SCOOTER INCLUDING BRAKE SYSTEM

(76) Inventor: Wang-Chuan Chen, Taichung Hsien (TW)

( * ) Notice: Subject to any disclaimer, the term of this patent is extended or adjusted under 35 U.S.C. 154(b) by 0 days.

(21) Appl. No.: 12/839,447

(22) Filed: Jul. 20, 2010

(51) Int. Cl.
*B62M 1/00* (2010.01)
(52) U.S. Cl. .................................................. 280/87.041
(58) Field of Classification Search .............. 280/47.34, 280/62, 87.01, 87.021, 87.041, 87.042, 87.05; 188/19, 20, 21, 22, 29, 31, 74
See application file for complete search history.

(56) References Cited

U.S. PATENT DOCUMENTS

| | | | | |
|---|---|---|---|---|
| 1,075,250 A * | 10/1913 | Gingold | ................... | 280/87.041 |
| 1,548,973 A * | 8/1925 | Beeler | ..................... | 280/87.01 |
| 1,620,939 A * | 3/1927 | Behm | ....................... | 280/7.12 |
| 2,170,978 A * | 8/1939 | Smith | ....................... | 280/87.05 |
| 3,385,608 A * | 5/1968 | Waddell | ................... | 280/11.204 |
| 4,084,831 A * | 4/1978 | Akonteh et al. | ......... | 280/11.215 |
| 4,234,204 A * | 11/1980 | Tibbals | .................... | 280/87.042 |
| 5,671,934 A * | 9/1997 | Harrod | ...................... | 280/87.05 |
| 6,213,484 B1 * | 4/2001 | Rohner | .................... | 280/87.042 |
| 6,234,501 B1 * | 5/2001 | Chen | ........................ | 280/87.041 |
| 6,296,082 B1 * | 10/2001 | Tsai | ............................... | 188/19 |
| 6,409,187 B1 * | 6/2002 | Crow, Jr. | ................... | 280/47.34 |
| 6,481,728 B2 * | 11/2002 | Chen | ........................ | 280/87.041 |
| 6,805,368 B1 * | 10/2004 | Chen | ........................ | 280/87.041 |
| 6,921,566 B2 * | 7/2005 | Lipstein | ...................... | 428/40.1 |
| 7,213,819 B2 * | 5/2007 | Carbonero | ................ | 280/79.11 |
| 7,303,199 B2 * | 12/2007 | Chen | ........................ | 280/87.041 |
| 7,597,333 B2 * | 10/2009 | Stillinger | ................. | 280/87.041 |
| 7,600,768 B2 * | 10/2009 | Chen et al. | ............... | 280/87.042 |
| 2002/0017768 A1 * | 2/2002 | Nardone | ................. | 280/87.041 |
| 2002/0020980 A1 * | 2/2002 | Lee | .......................... | 280/87.041 |
| 2002/0030339 A1 * | 3/2002 | Powers | ..................... | 280/87.041 |
| 2002/0056595 A1 * | 5/2002 | Shaw | .................................. | 188/5 |
| 2002/0093161 A1 * | 7/2002 | Udwin et al. | .............. | 280/87.05 |
| 2002/0096849 A1 * | 7/2002 | Bang | ......................... | 280/87.041 |
| 2002/0113391 A1 * | 8/2002 | Wang et al. | ............... | 280/87.05 |
| 2002/0180168 A1 * | 12/2002 | Rizk | ......................... | 280/87.041 |
| 2004/0227317 A1 * | 11/2004 | Cheng | ...................... | 280/87.041 |
| 2006/0145443 A1 * | 7/2006 | Morris | ...................... | 280/87.01 |
| 2007/0045976 A1 * | 3/2007 | Wu | ........................... | 280/87.041 |
| 2007/0170686 A1 * | 7/2007 | Chen | ............................. | 280/218 |
| 2007/0252355 A1 * | 11/2007 | Chen et al. | ............... | 280/87.042 |
| 2007/0278763 A1 * | 12/2007 | Saville | .......................... | 280/269 |
| 2008/0203691 A1 * | 8/2008 | Hsu | .......................... | 280/87.041 |
| 2009/0273152 A1 * | 11/2009 | Chung | ..................... | 280/87.042 |
| 2010/0123295 A1 * | 5/2010 | Landau | .................... | 280/87.042 |
| 2010/0253027 A1 * | 10/2010 | Chen et al. | ............... | 280/87.042 |
| 2010/0314851 A1 * | 12/2010 | Palmer et al. | ............ | 280/87.042 |

FOREIGN PATENT DOCUMENTS

TW        M266958        6/2005

OTHER PUBLICATIONS

Plank Skateboards, Accessories, Copyright 2006.*

* cited by examiner

*Primary Examiner* — J. Allen Shriver, II
*Assistant Examiner* — Brodie Follman
(74) *Attorney, Agent, or Firm* — Alan Kamrath; Kamrath IP Lawfirm, PA

(57) ABSTRACT

A scooter includes a board for supporting the user thereof, at least one wheel assembly mounted on the board for facilitating movement and transportation of the board, and a braking system operable in a first mode that engages with and imparts a braking force to the at least one wheel assembly for stopping the scooter, and in a second mode that is subject to a force and is caused to disengage from the at least one wheel assembly for allowing the scooter to be moved without being subject to any braking force.

20 Claims, 17 Drawing Sheets

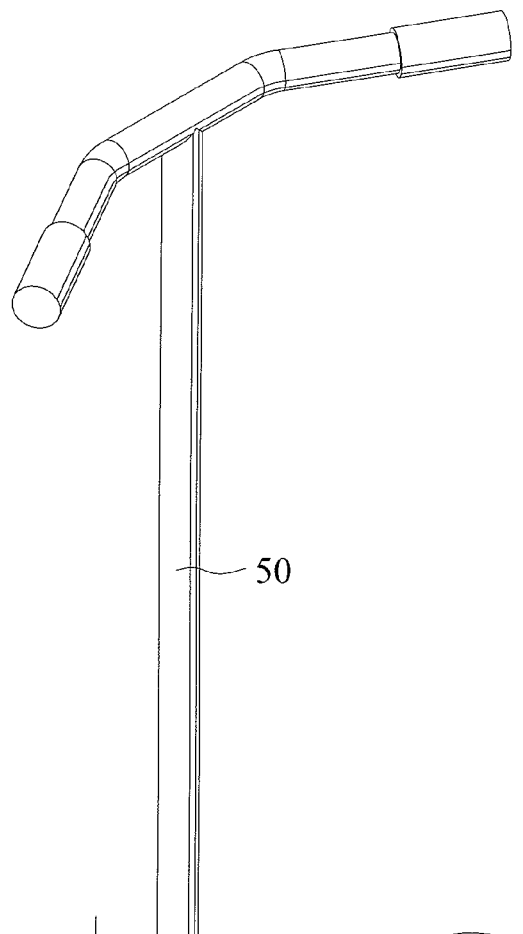
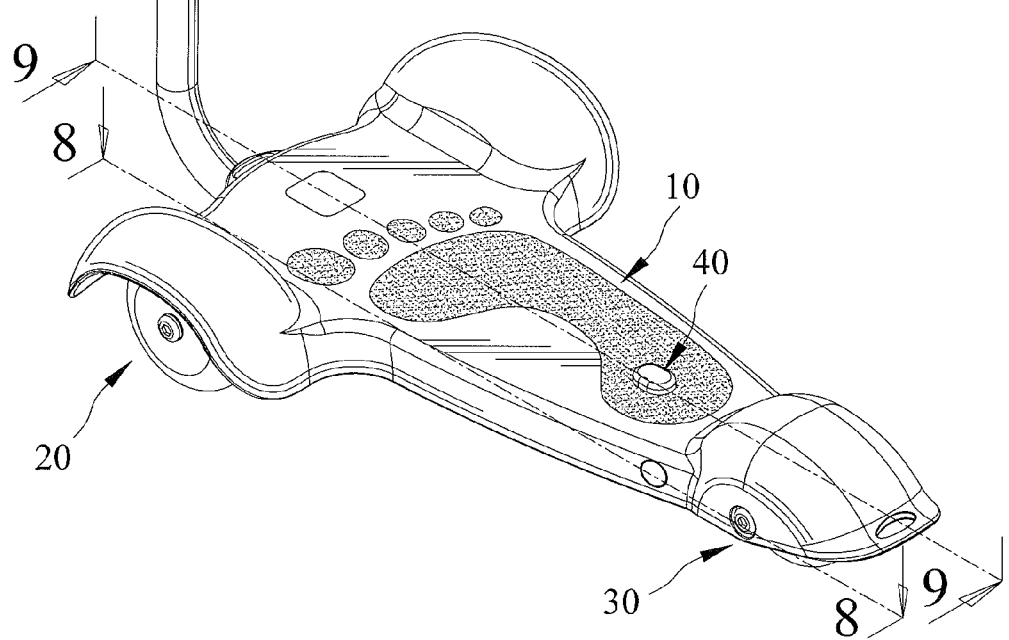
FIG. 1

SCOOTER INCLUDING BRAKE SYSTEM

BACKGROUND OF THE INVENTION

1. Field of the Invention

The present invention relates to a scooter and, in particular, to a scooter including a brake system.

2. Description of the Related Art

To ride a scooter, the user would place his/her one leg on the scooter and uses the other leg to push off with so that the scooter starts moving, and to stop the scooter, the user would drag a foot on the ground until the scooter slows down and stops. The problem is that most scooters do not have a brake system.

Referring to TW Pat. No. M266958, a scooter includes a front wheel, a rear wheel and a pressing member disposed above the rear wheel. The pressing member is pivotal to a position that abuts against the real wheel. Accordingly, the user pushes the pressing member against the rear wheel if he/she wishes to stop riding the scooter. Additionally, once the leg is taken off the pressing member, the pressing member would pivot away from the rear wheel automatically. However, it is not easy for the user to push the pressing member against the rear wheel as he/she is riding on the scooter. The problem is that the user has to balance his/her weight on the scooter with one leg while he applies a force to push the pressing member to resist against the rotating rear wheel with the other leg. Since the pressing member and the rear wheel are subject to repetitive frictional forces and pressures from rubbing against each other and it is liable that the user pushes the pressing member against the rear wheel too excessively, the pressing member and the rear wheel are susceptible to wear and breakage more easily.

The present invention is, therefore, intended to obviate or at least alleviate the problems encountered in the prior art.

SUMMARY OF THE INVENTION

According to the present invention, a scooter includes a board for supporting the user thereof including a first side and a second side in opposition to the first side, with the user being in contact with the first side during the operation of the scooter. At least one wheel assembly is mounted on the board for facilitating movement and transportation of the board. Furthermore, the scooter includes a braking system operable in a first mode that engages with and imparts a braking force to the at least one wheel assembly for stopping the scooter and operable in a second mode that is subject to a force and is caused to disengage from the at least one wheel assembly for allowing the scooter to be moved without being subject to any braking force. Consequently, when the user wants to ride the scooter he/she uses his/her foot on the board to apply a force on the braking system such that the braking system is caused to operate in the first mode, and when he/she wants to stop the scooter he/she takes his/her foot off the braking system such that the braking system is caused to operate in the second mode, respectively.

It is an object of the present invention to provide a scooter with a braking system.

It is another object of the present invention to provide a braking system that is easy to be operated.

It is a further object of the present invention to provide a braking system that the user is hindered from applying a force too excessively to damage a wheel assembly.

Other objects, advantages, and new features of the present invention will become apparent from the following detailed description of the invention when considered in conjunction with the accompanied drawings.

BRIEF DESCRIPTION OF THE DRAWINGS

FIG. 1 is a perspective view of a scooter with a brake system in accordance with the present invention.

DETAILED DESCRIPTION OF THE PREFERRED EMBODIMENT

Figure 2:
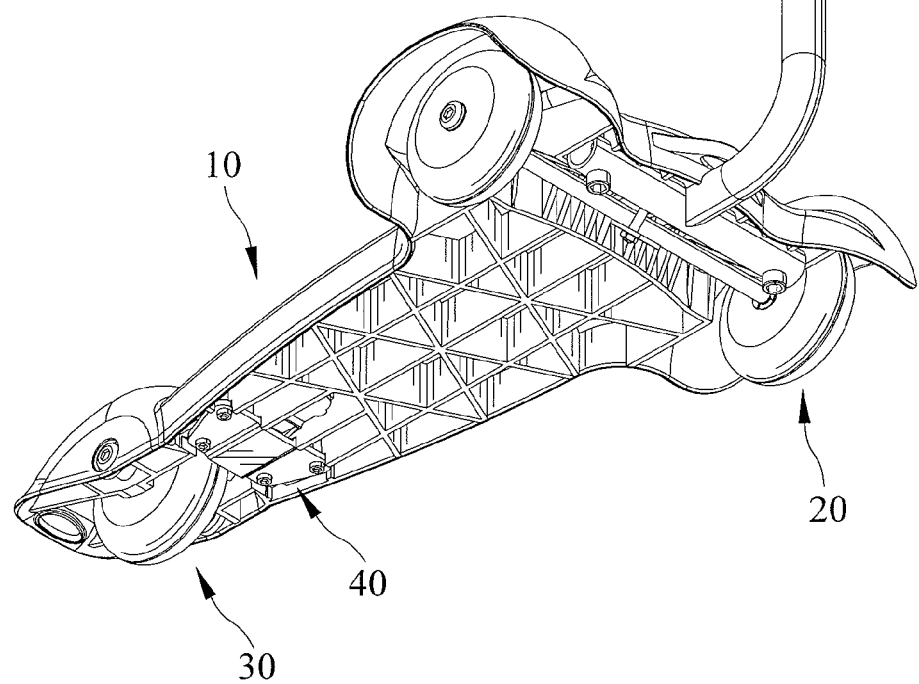
FIG. 2 is another perspective view of the scooter shown in FIG. 1.
Figure 3:
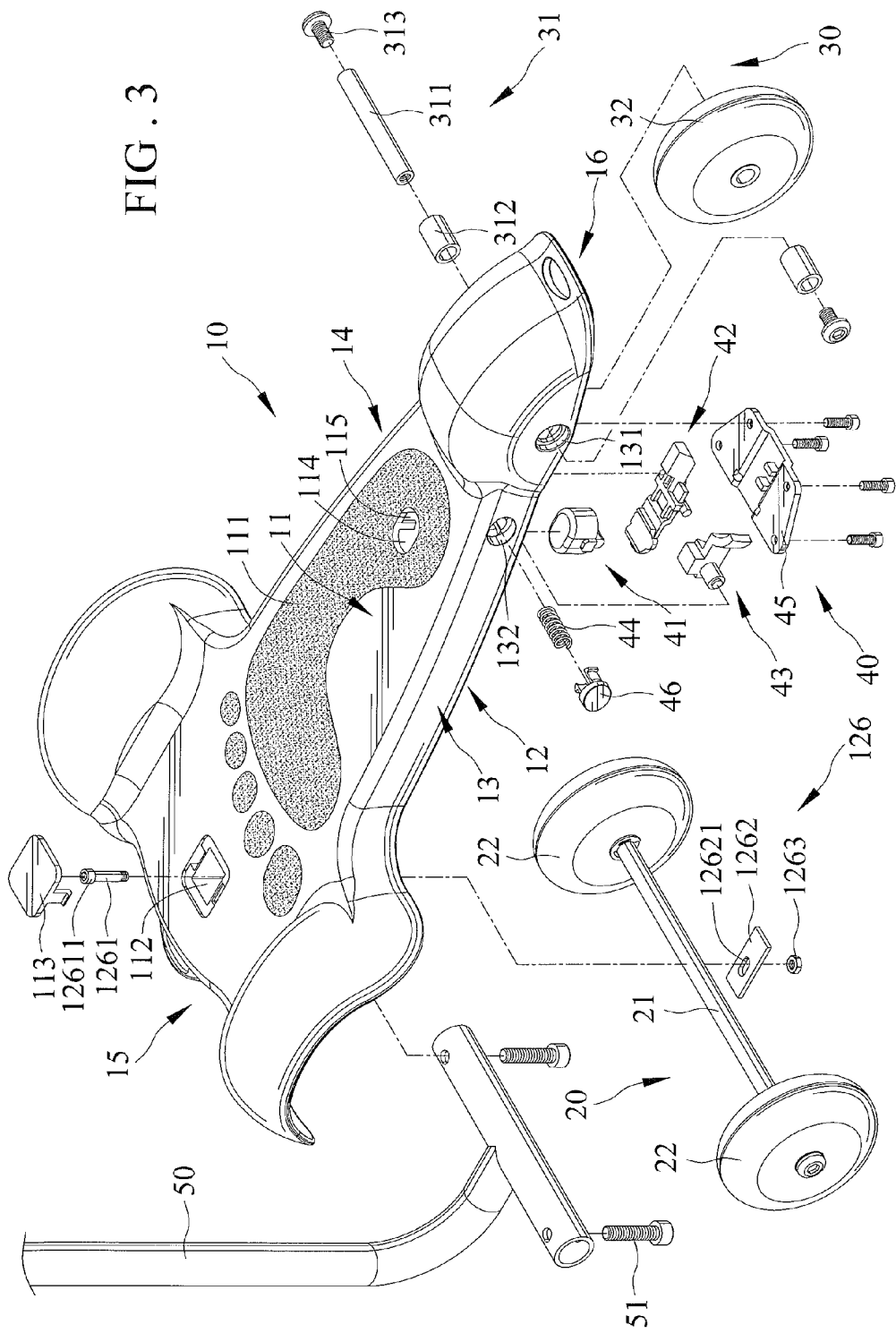
FIG. 3 is an exploded perspective view of the scooter shown in FIG. 1.
Figure 4:
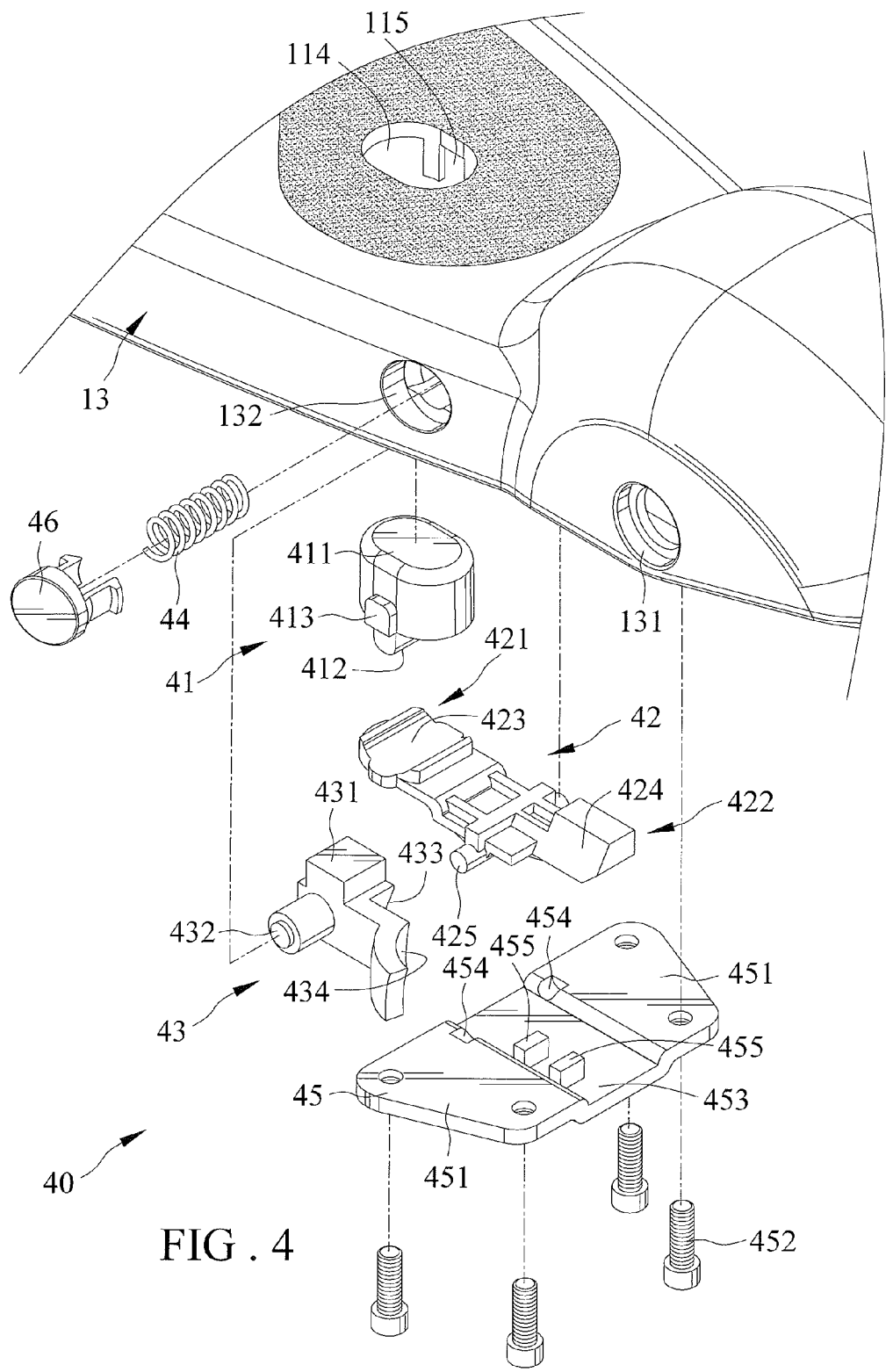
FIG. 4 is a partial, enlarged view of the scooter shown in FIG. 3.
Figure 5:
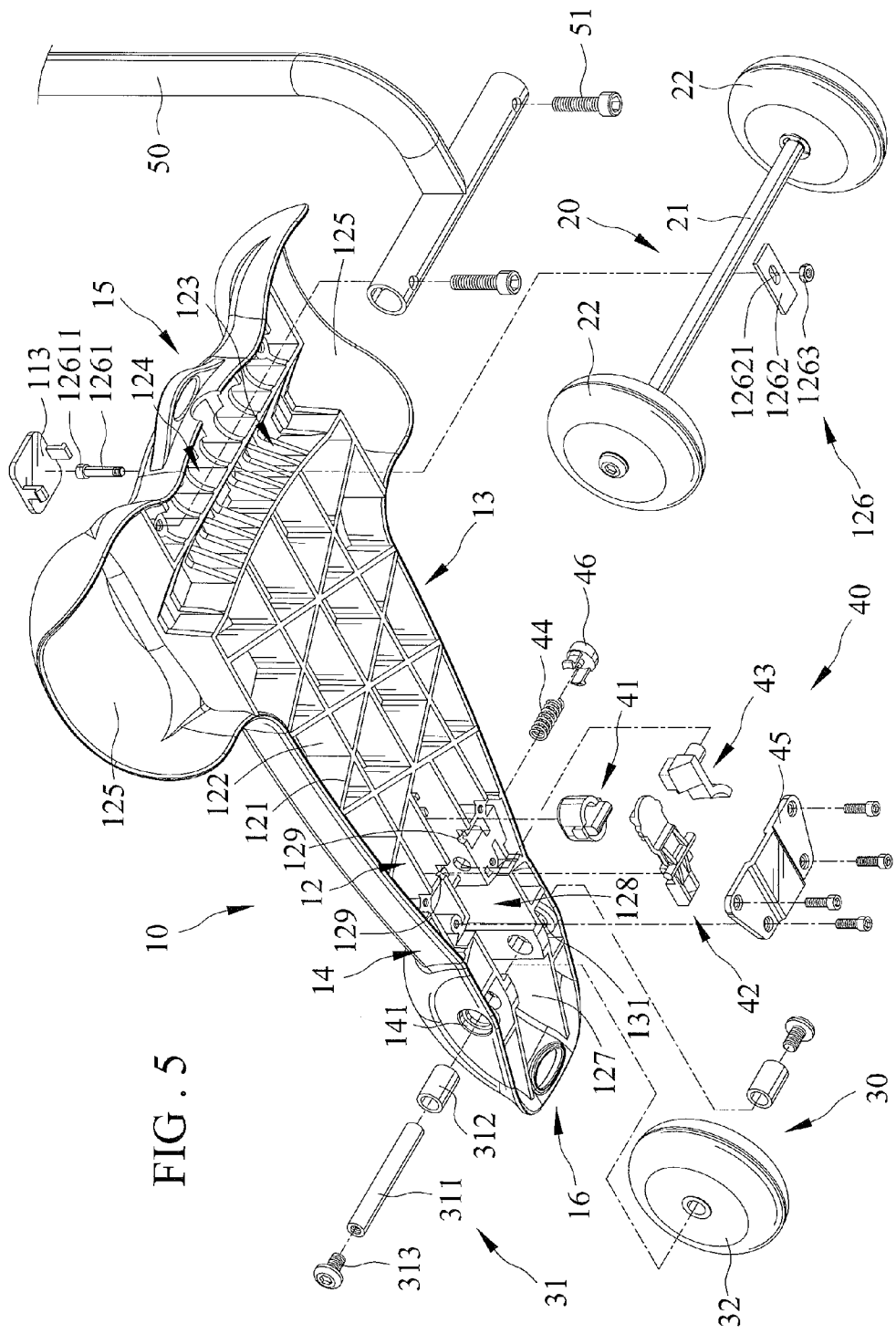
FIG. 5 is another exploded perspective view of the scooter shown in FIG. 1.
Figure 6:
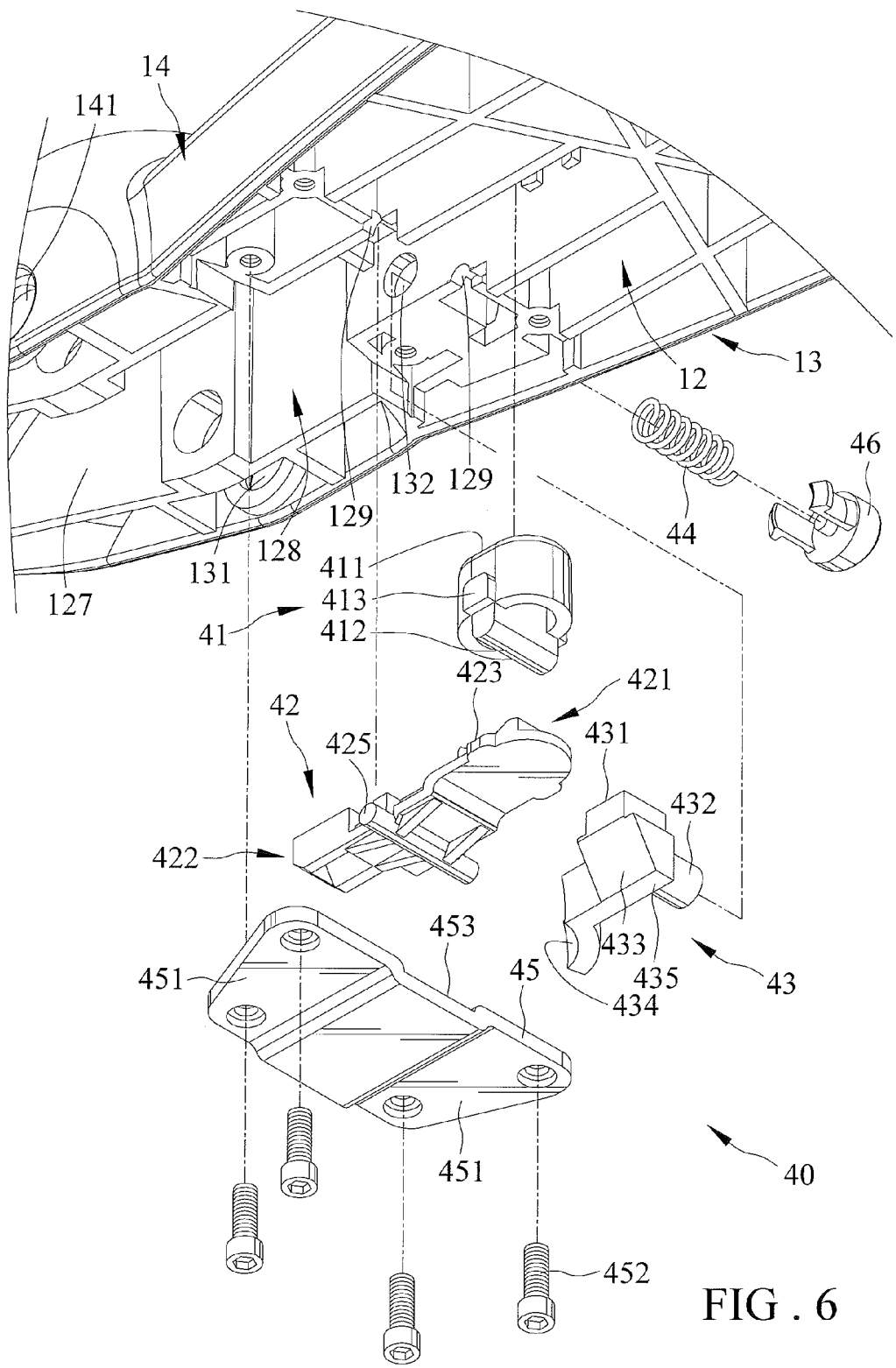
FIG. 6 is a partial, enlarged view of the scooter shown in FIG. 5.
Figure 7:
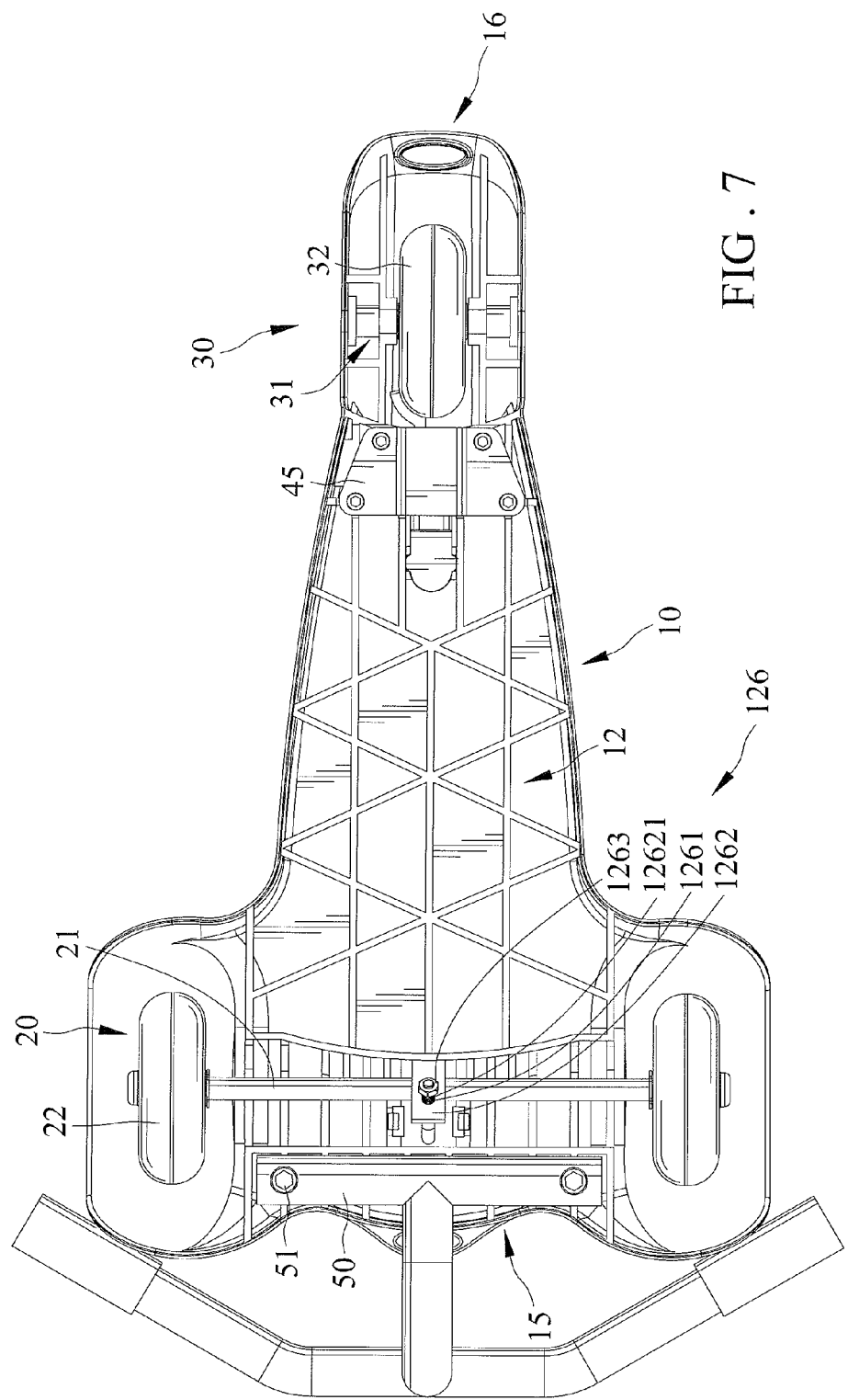
FIG. 7 is a bottom view of the scooter shown in FIG. 1.
Figure 8:
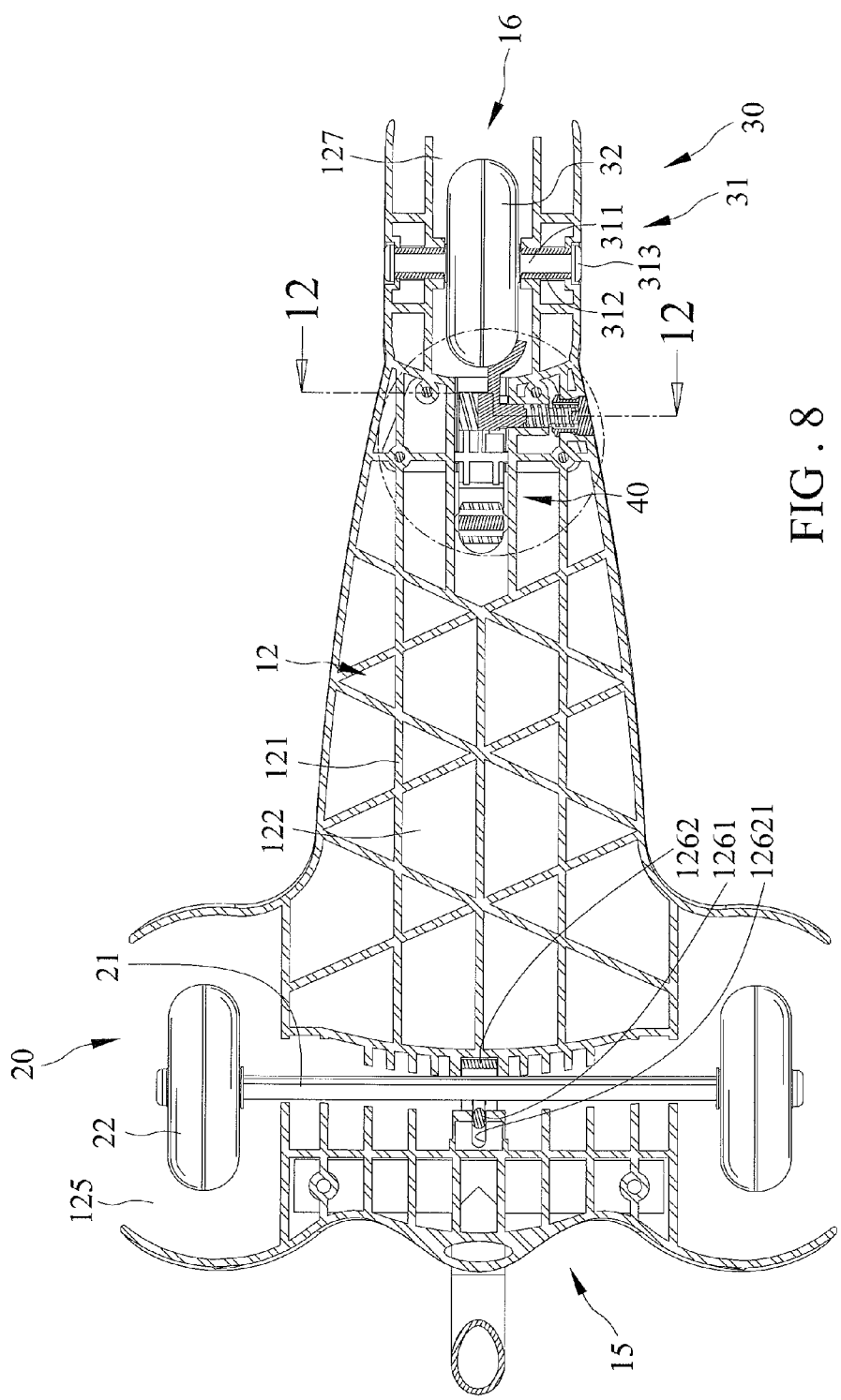
FIG. 8 is a cross-sectional view taken along line 8-8 of FIG. 1.
Figure 9:
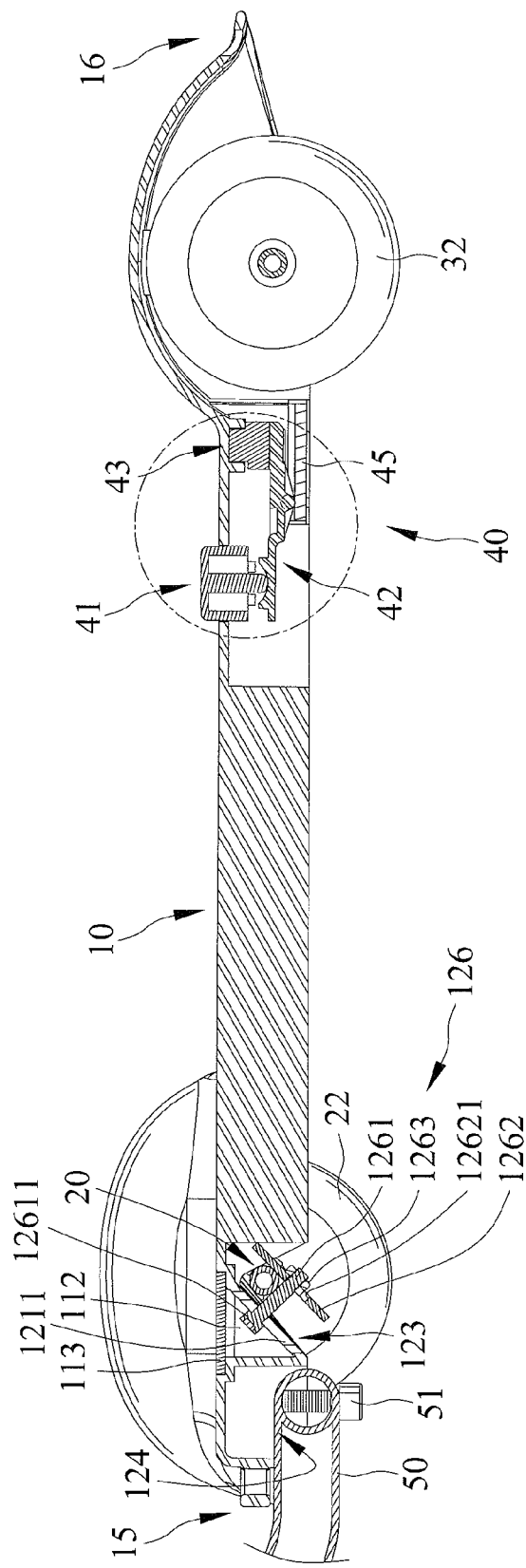
FIG. 9 is a cross-sectional view taken along line 9-9 of FIG. 1.
Figure 10:
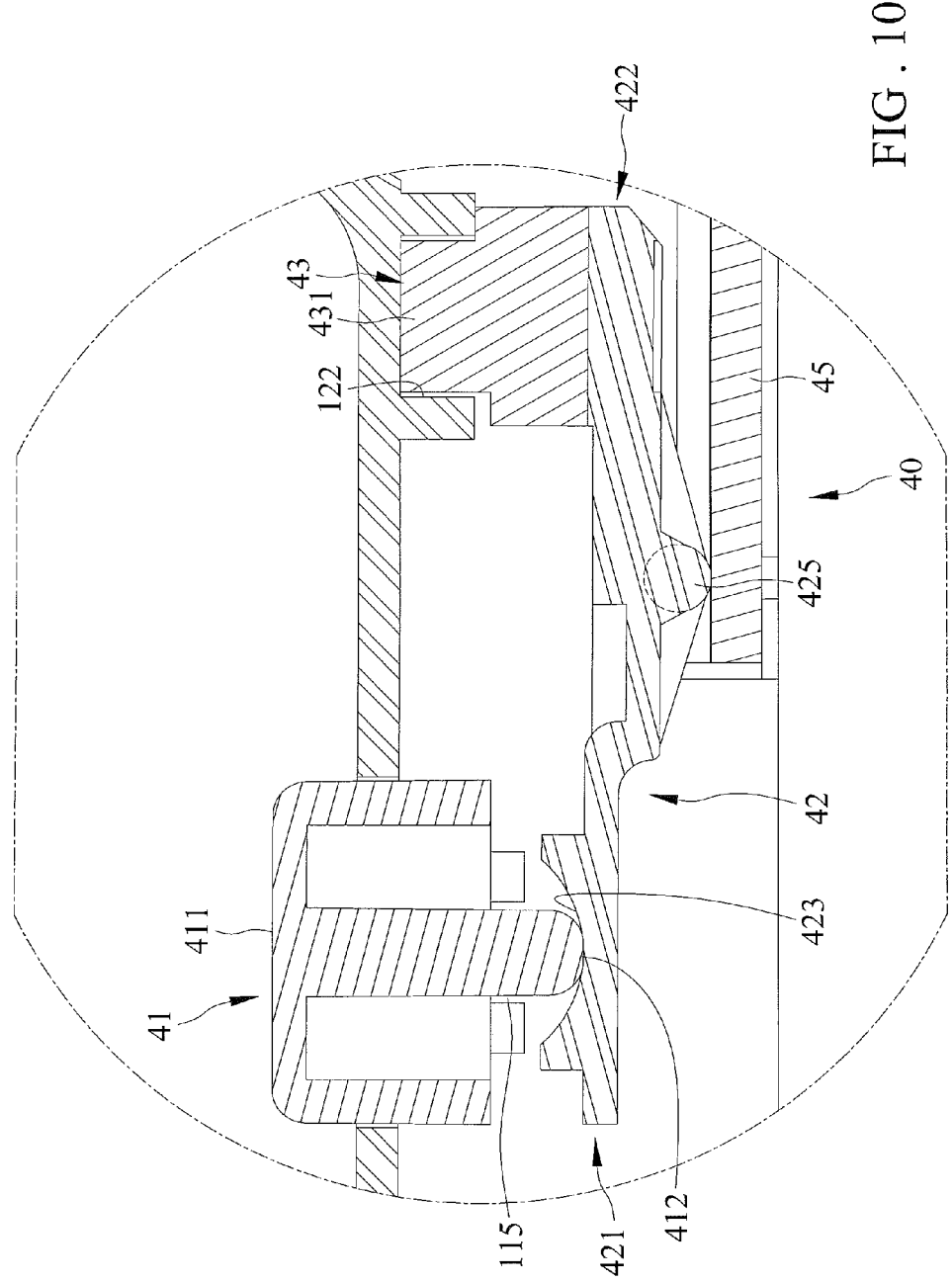
FIG. 10 is a partial, enlarged view of the scooter shown in FIG. 9 and shows the brake system operated in a first mode for stopping the scooter.
Figure 11:
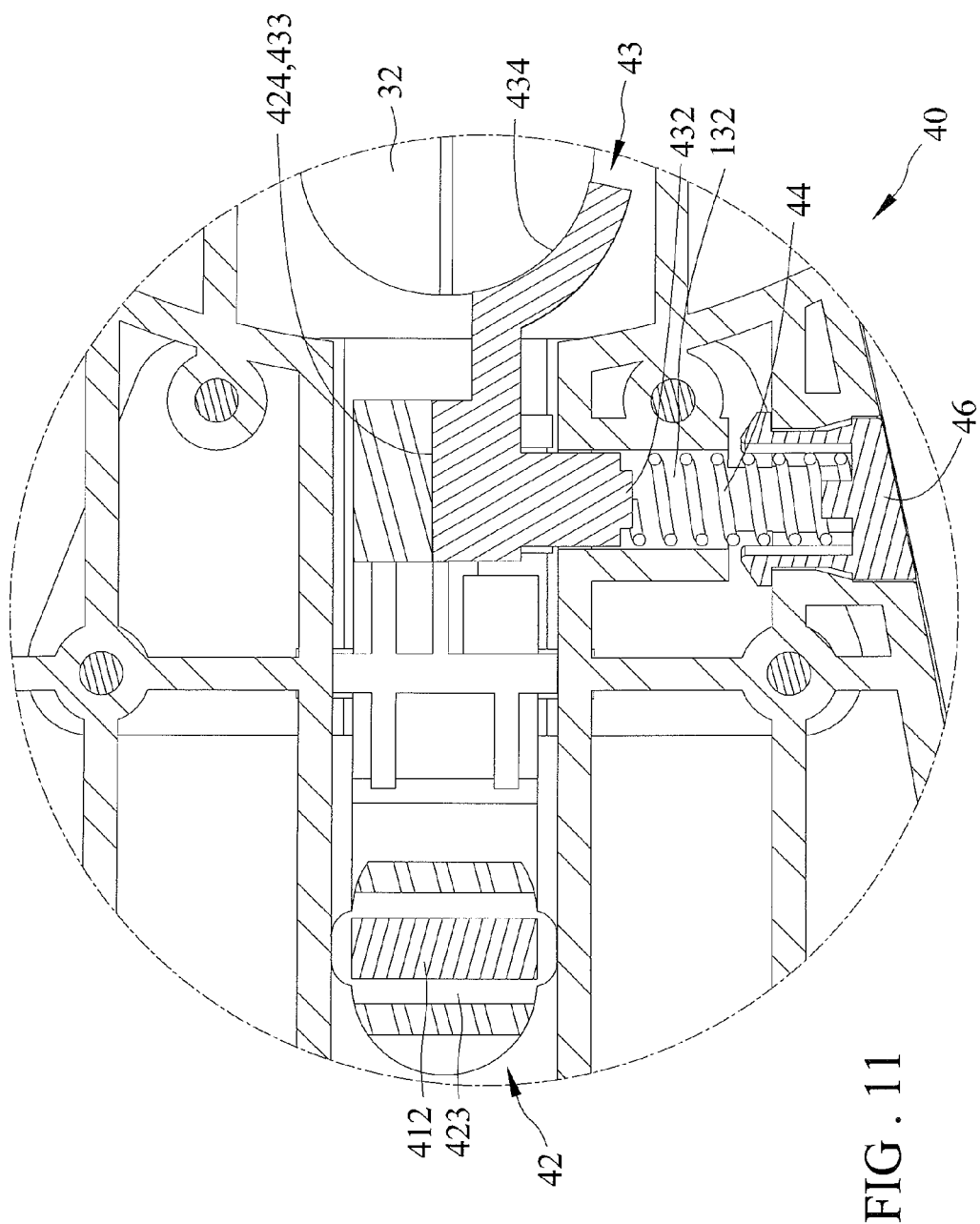
FIG. 11 is a partial, enlarged view of the scooter shown in FIG. 8 and is an extended view of FIG. 9, wherein the brake system is operated in the first mode.
Figure 12:
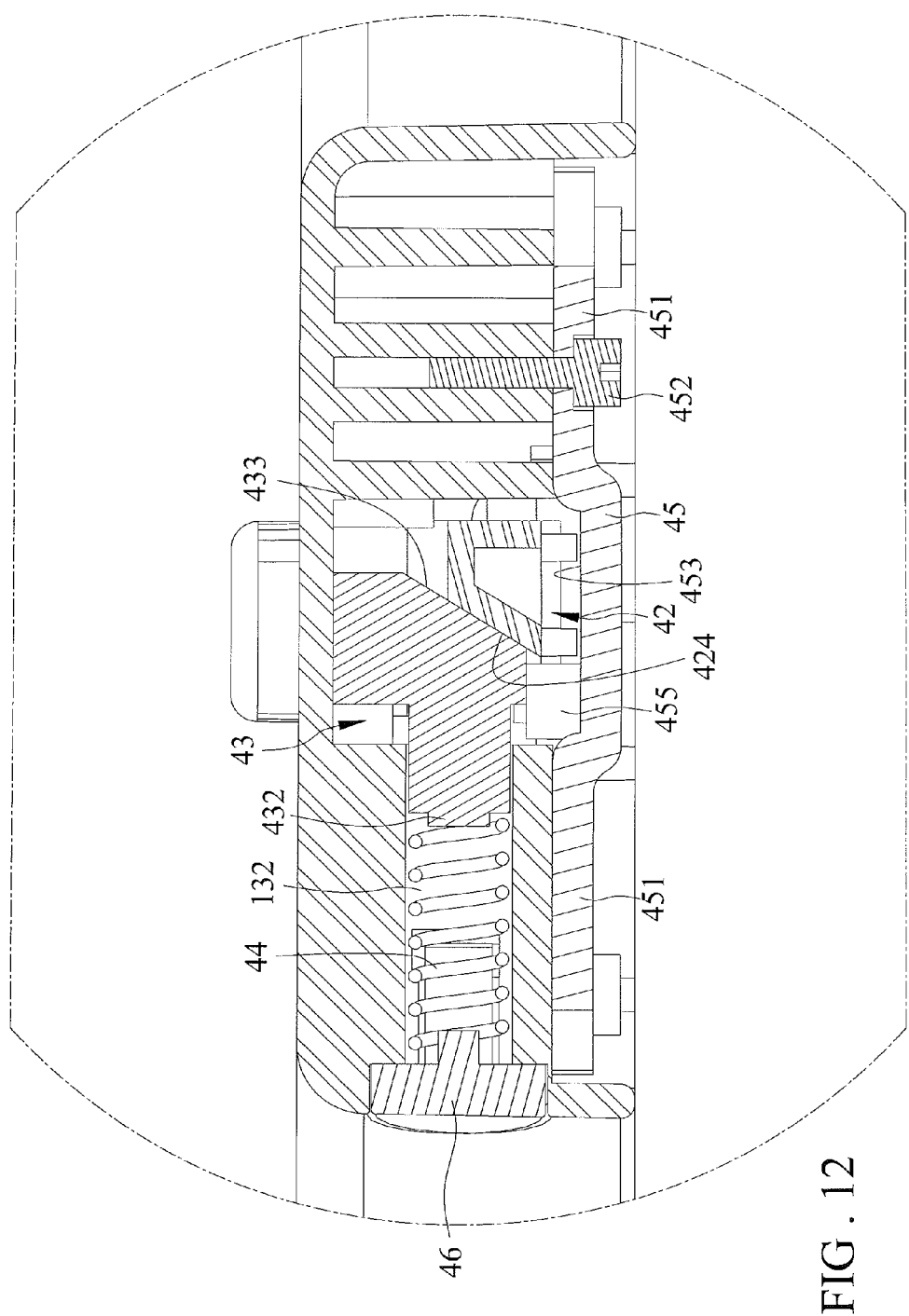
FIG. 12 is a cross-sectional view taken along line 12-12 of FIG. 8.
Figure 13:
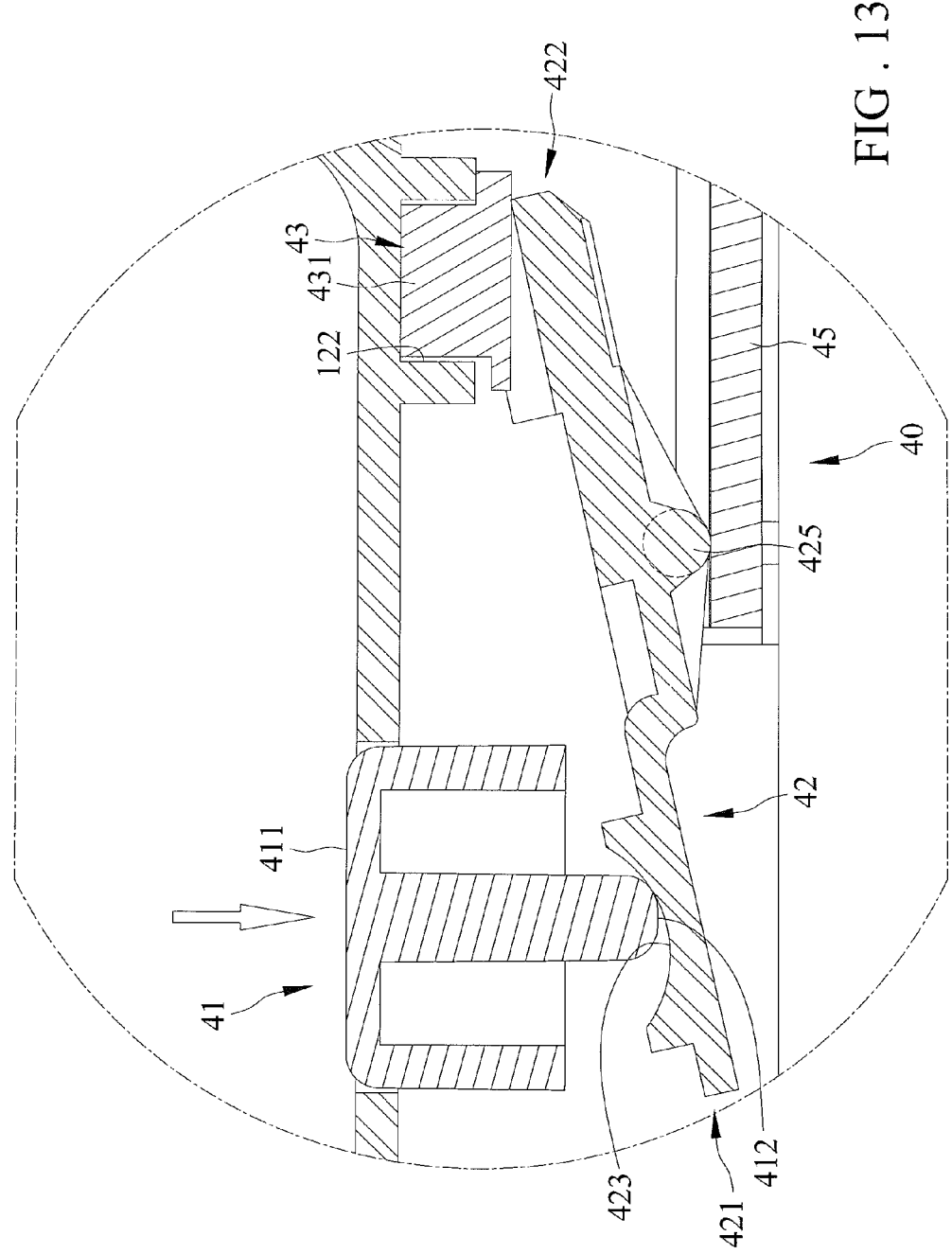
FIG. 13 is a cross-sectional view showing the brake system operated in a second mode in which the scooter is adapted to be moved and is not subject to any braking force.
Figure 14:
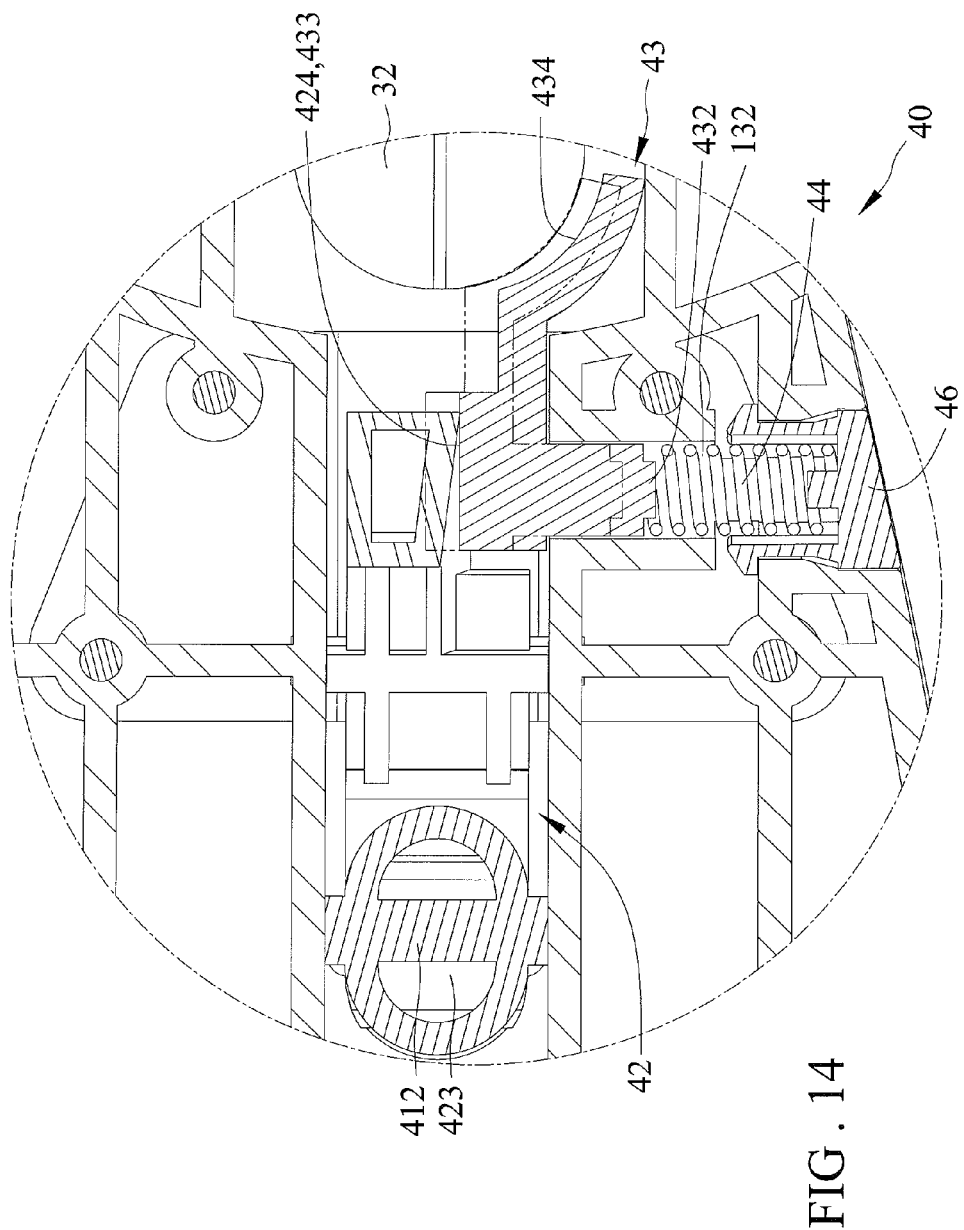
FIG. 14 is an extended view of FIG. 11 but shows the brake system in the second mode.
Figure 15:
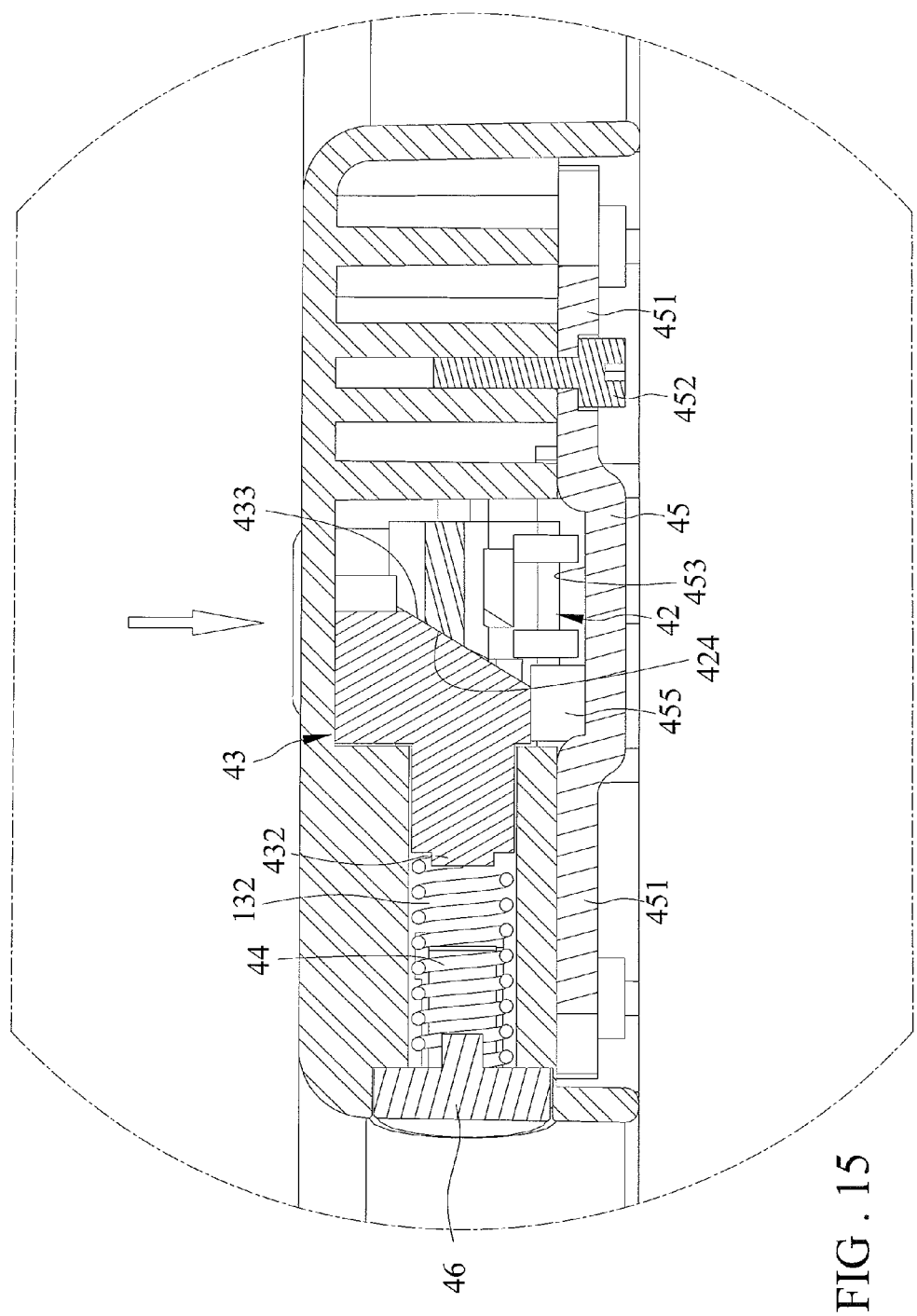
FIG. 15 is an extended view of FIG. 12 but shows the brake system in the second mode.

The present invention discloses a scooter. The scooter includes a board 10 for supporting the user thereof. The board 10 includes a first side 11 and a second side 12 in opposition to the first side 11 and a structure, which extends from the first side 11 to the second side 12 and which includes a plurality of ribs 121 arranged to form an array of a plurality of cells including a plurality of spaces 122, respectively. Consequently, the material and weight of the board 10 are saved, and the structural strength of the board 10 is not compromised. The board 10 further includes a lateral side extending from a peripheral edge of the first side 11 to a peripheral edge of the second side 12 and defining a first lateral side 13 and a second lateral side 14 on opposite sides of the board 10.

In use of the scooter, the user is in contact with the first side 11 of the board 10. An anti-slippery surface 111 is defined on the first side 11. The anti-slippery surface 111 can prevent the user from slipping off the board 10. Additionally, the anti-slippery surface 111 has a figurative shape that is adapted to indicate to the user what are the go forward and go reverse directions. In the embodiment shown, the anti-slippery surface 11 is in a shape of a footprint.

Furthermore, the scooter includes a first wheel assembly 20 mounted on a first end 15 of the board 10 and a second wheel assembly 30 mounted on a second end 16 of the board 10, respectively, for facilitating movement and transportation of the board 10. The first end 15 is in opposition to the second end 16. The first wheel assembly 20 includes a shaft 21 and two first wheels 22 disposed on two opposing distal ends of the shaft 21, respectively. The shaft 21 is received in a first notch 123, and the two first wheels 22 are received in two compartments 125, respectively. The first notch 123 and the two compartments 125 are defined in the second side 12 of the board 10. Further, a fastening device 126 is utilized to prevent the first wheel assembly 20 from disengagement from the board 10. The fastening device 126 includes a fastener 1261, a holding plate 1262, and a retainer 1263. The fastener 1261 is inserted through a cavity 112 extending from the first side 11 towards the second side 12 of the board 10 through a slot 1211 extending through a wall which defines a boundary between the cavity 112 and the first notch 123, as well as through a hole 12621 extending through the holding plate 1262, sequentially. The fastener 1261 is thready engaged with the retainer 1263. Furthermore, the fastener 1261 includes a head 12611 that is unable to pass through the slot 1211. The retainer 1263 is of a size that is unable to pass through the hole 12621. The holding plate 1262 includes a distal end abutted against the second side 12 of the board 10 and is retained in place after the fastener 1261 is engaged with the retainer 1263. Consequently, the fastening device 126 includes the fastener 1261 and the holding plate 1262 cooperating together to enclose the shaft 21 of the first wheel assembly 20 in the first notch 123 for preventing the first wheel assembly 20 from disengagement from the board 10. Additionally, since the cavity 112 extends from the first side 11 towards the second side 12 of the board 10, it includes an opening defined in the first side 11 of the board 10. In order to make the board 10 appear neat and tidy, a cover 113 is utilized to close the opening of the cavity 112. The cover 113 is mounted on the board 10 after the fastener 1261 of the fastening device 126 is inserted through the opening of the cavity 112. Consequently, the inside of the cavity 112 and the fastener 1261 are prevented from being dusted, and the fastener 1261 is prevented from being inadvertently adjusted.

In addition, the second wheel assembly 30 includes a connecting device 31 and a second wheel 32 connected to the board 10 by the connecting device 31. The connecting device 31 includes an axle 311, two sleeves 312, and two fastening members 313. The second wheel 32 is rotatably mounted on an outer periphery of the axle 311 and is received in a compartment 127. The compartment 127 is disposed adjacent to the second end 16 of the board 10 and extends in the second side 12 of the board 10. The axle 311 is retained between the first and second lateral sides 13 and 14 by the two fastening members 313, with one fastening member 313 mounted in a bore 131 defined in the first lateral side 13 and engaged with one of two opposing distal ends of the axle 311, with the other fastening member 313 mounted in a bore 141 defined in the second lateral side 14 and engaged with the other of the two opposing distal ends of the axle. The axle 311 is thready engaged with the two fastening members 313. Additionally, the sleeves 312 are connected to two opposing distal ends of the axle 311 and disposed on the outer periphery of the axle 311 so as to enable the axle 311 to rotate in an easy manner. Moreover, the axle 311 is prevented from abrading against the first and second lateral sides 13 and 14 of the board 10 by the sleeves 312.

Furthermore, the scooter includes a braking system 40 operable in a first mode that engages with and imparts a braking force to the second wheel assembly 30 for stopping the scooter, and in a second mode that is subject to a force and is caused to disengage from the second wheel assembly 30 for allowing the scooter to be moved without being subject to any braking force. The braking system 40 includes an actuating member 41, a levering member 42, an engaging member 43, a resilient member 44, a retaining member 45 and a cap 46. The actuating member 41 is moveably disposed in a receptacle 114 defined in the board 10. The receptacle 114 extends from the first side 11 to the second side 12 of the board 10 and is disposed adjacent to a rear end of the anti-slippery surface 111 adjacent to the second end 16 of the board 10. Also, the actuating member 41 includes a user-interface side 411 exposed outside an opening of the receptacle 114 defined in the first side 11 of the board 10, an urging section 412, and two position-limiting sections 413 extending from an outer periphery thereof. Each positioning limiting section 413 is engaged in a position-limiting stop 115 defined in the board 10. The position-limiting stop 115 prevents the actuating member 41 from disengaging from the receptacle 114. Additionally, the urging section 412 of the actuating member 41 is engaged with the levering member 42 and, in particular, with an engaging section 423 of the levering member 42. The levering member 42 includes a first terminal end 421 and a second terminal end 422 in opposition to the first terminal end 421. The engaging section 423 is defined adjacent to the first terminal end 421 of the levering member 42. The levering member 42 is disposed in a compartment 128 defined in the board 10. The compartment 128 extends in the second side 12 of the board 10. Also, the levering member 42 is rotatably supported about a fulcrum 425 and is rotated under a force applied to the user-interface side 411 of the actuating member 41. The fulcrum 425 is defined between the first and second terminal ends 421 and 422 and is located in a recess 129 defined in the second side 12 of the board 10. Additionally, the engaging section 423 of the levering member 42 is an arcuate surface, and the urging section 412 of the actuating member 41 that engages with the engaging section 423 is arcuate. Consequently, the actuating member 41 can rotate the levering member 42 in a more frictionless and effortless manner.

The levering member 42 further includes a first interacting face 424 defined on the second terminal end 422 and engaged with the engaging member 43 and, in particular, with a second interacting face 433 of the engaging member 43. The first interacting face 424 is a sloped surface, and the second interacting face 433 is a sloped surface that complements to the first interacting face 424. Consequently, the engaging member 43 is caused to move in a first direction as the levering member 42 is rotated in a first rotational direction, and to move in a second direction as the levering member 42 is rotated in a second rotational direction. The first direction is opposite to the second direction. Likewise, the first rotational direction is opposite to the second rotational direction.

In addition, the engaging member 43 includes a retaining section 431, a protuberance 432, and a brake section 434. The retaining section 431 is disposed in one of the plurality of spaces 122 defined in the board 10 and is engaged with a guiding channel (not numbered) defined in the board 10 for the engaging member 43 to accomplish predetermined directions of movement. The protuberance 432 is abutted against one of two opposing ends of the resilient member 44. Also, the protuberance 432 and the second interacting surface 433 are disposed on opposite sides of the engaging member 43. The brake section 434 is selectively engaged with the second wheel assembly 30. Consequently, when the braking system 40 is operated in the first mode, the brake section 434 engages with the second wheel assembly 30, whereas when the braking system 40 is operated in the second mode, the brake section 434 disengages from the second wheel assembly 30. Moreover, the engaging member 43 includes a bottom side 435 supported on at least one projection 455 extended from a receiving section 453 of the retaining member 45. The retaining member 45 is fastened to the board 10 by a plurality of fastening members 452 inserted into two connecting fins 451 of the retaining member 45 and engaged with the board 10. The two connecting fins 451 extend oppositely from two opposite sides of the receiving section 453. Consequently, the engaging member 43 is prevented from disengagement from the levering member 42. Additionally, the levering member 42 is also supported on the retaining member 45. Consequently, the levering member 42 is prevented from disengagement from the actuating member 41 and the engaging member 43. Furthermore, the retaining member 45 includes a recess 454 defined therein for receiving the fulcrum 425. Consequently, the fulcrum 425 is enclosed by peripheries of the recesses 129 and 454.

In addition, the cap 46 of the braking system 40 is abutted against the other of the two opposing ends of the resilient member 44 and is insertably mounted in a bore 132 defined in the first lateral side 13 of the board 10 and retained in place. Consequently, the engaging member 43 is subject to a biasing force imparted by the resilient member 44.

Figure 16:
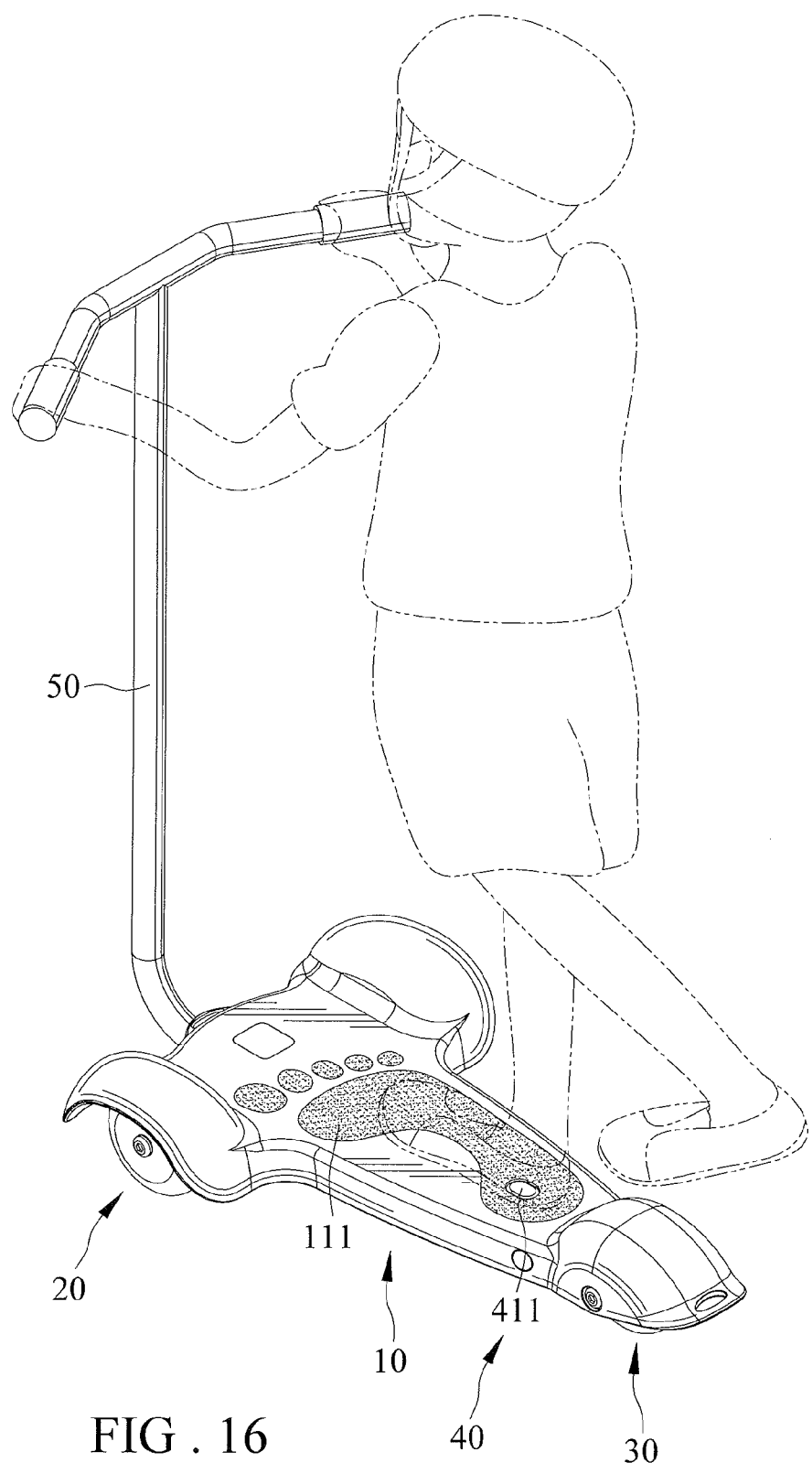
FIG. 16 shows the operation of the scooter embodying the present invention, with the brake system stepped by the user so that it is operated in the second mode.
Figure 17:
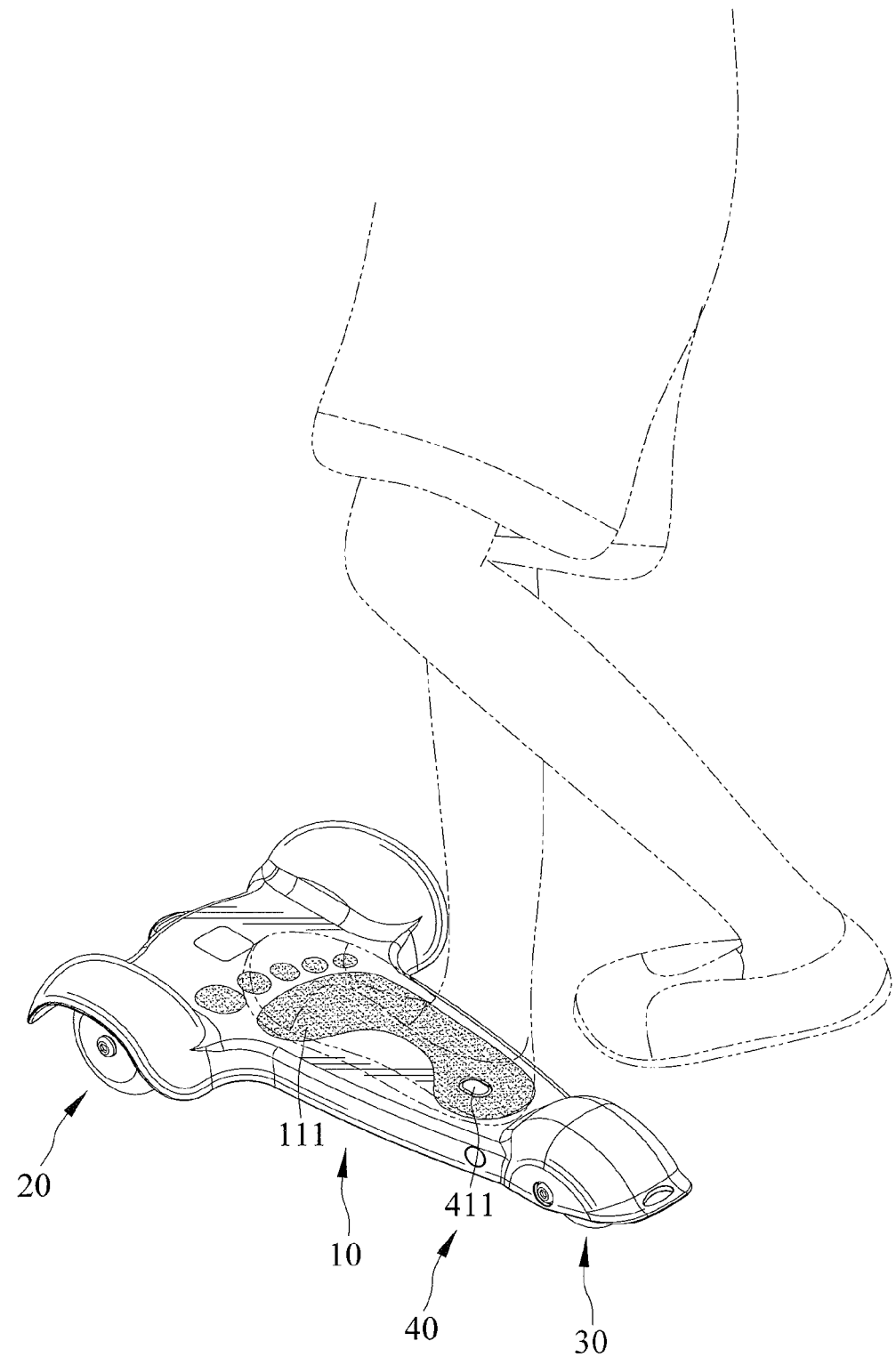
FIG. 17 shows the operation of the scooter embodying the present invention, with the brake system stepped by the user so that it is operated in the second mode, and with a steering handle of the scooter removed.

The scooter further includes a steering handle 50 mounted on the board 10 for the user to grasp during the operation of the scooter, as shown in FIG. 16. The steering handle 50 includes a structure disposed in a second notch 124 defined in the board 10 for connection with the board. The second notch 124 is disposed adjacent to the first end 15 of the board 10. Further, a plurality of fastening members 51 is used to fix the steering handle 50. The plurality of fastening members 51 is inserted into the steering handle 50 and engaged with the board 10. Likewise, the scooter embodying the present invention is adapted to be operated without the steering handle 50, so the steering handle 50 can be removed from the scooter, as shown in FIG. 17.

Accordingly, when the user wants to ride the scooter, he/she uses his/her foot on the board 10 to apply a force on the braking system 40 such that the braking system 40 is caused to operate in the first mode, and when he/she wants to stop the scooter, he/she takes his/her foot off the braking system 40 such that the braking system 40 is caused to operate in the second mode, respectively. When the braking system 40 is operated in the second mode, the actuating member 41 is depressed, and the levering member 42 is caused to rotate about the fulcrum 425 in the first rotational direction, and the engaging member 43 is caused to move in the first direction to cause the brake section 434 thereof to disengage from the second wheel assembly 30, and the resilient member 44 is depressed by the protuberance 432 of the engaging member 43. Additionally, when the braking system 40 is operated in the first mode, the actuating member 41 is not depressed, and the levering member 42 is caused to rotate about the fulcrum 425 in the second rotational direction, and the engaging member 43 is caused to move in the second direction to cause the brake section 434 thereof to engage with the second wheel assembly 30, and the resilient member 44 is released from an urging force from the protuberance 432 of the engaging member 43.

In view of the forgoing, it is easy and convenient for the user to operate the braking system 40. Also, the user is hindered from applying a force too excessively to damage the second wheel assembly 30.

While the specific embodiments have been illustrated and described, numerous modifications come to mind without significantly departing from the spirit of invention, and the scope of invention is only limited by the scope of the accompanying claims.

What is claimed is:

1. A scooter comprising:
a board for supporting a user thereof, with the board including a first side and a second side in opposition to the first side, with the user being in contact with the first side during operation;
at least one wheel assembly mounted on the board for facilitating movement and transportation of the board; and
a braking system operable in a first mode that engages with and imparts a braking force to the at least one wheel assembly for stopping the scooter, and in a second mode that is subject to a force and is caused to disengage from the at least one wheel assembly for allowing the scooter to be moved without being subject to any braking force; wherein when the user wants to ride the scooter he/she uses his/her foot on the board to apply a force on the braking system such that the braking system is caused to operate in the first mode, and when he/she wants to stop the scooter he/she takes his/her foot off the braking system such that the braking system is caused to operate in the second mode, respectively, wherein the braking system includes an actuating member, a levering member rotatably supported about a fulcrum and rotated under a force applied to the actuating member, an engaging member selectively engaged with the at least one wheel assembly and engaged with the levering member and moved in a first direction to disengage from the at least one wheel assembly for allowing the scooter to move without being subject to any braking force as the levering member is rotated in a first rotational direction and moved in a second direction to engage with the at least one wheel assembly for stopping the scooter as the levering member is rotated in a second rotational direction, a resilient member biasing the engaging member, and a cap retained in place, with the resilient member including one of two opposing ends abutted against the engaging member and the other of the two opposing ends abutted against the cap, wherein the actuating member includes a position-limiting section extending from an outer periphery thereof and engaged in a position-limiting stop defined in the board for preventing the actuating member from disengaging from the board.

2. The scooter as claimed in claim 1, wherein the board includes a structure extending from the first side to the second side and including a plurality of ribs arranged to form an array of a plurality of cells including a plurality of spaces, respectively.

3. The scooter as claimed in claim 1 further comprising an anti-slippery surface defined on the first side for preventing the user from slipping off the board and including a figurative shape adapted to indicate the user what are go forward and go reverse directions.

4. The scooter as claimed in claim 3, wherein the anti-slippery surface is in a shape of a footprint.

5. The scooter as claimed in claim 1, wherein the actuating member is moveably disposed in a receptacle defined in the board and includes a user-interface side exposed outside an opening of the receptacle defined in the first side of the board, and an urging section engaging with an engaging section of the levering member causing the lever member to be rotated, wherein the levering member includes a first interacting face engaged with a second interacting face of the engaging member for causing the engaging member to be moved.

6. The scooter as claimed in claim 5, wherein the fulcrum is disposed between the engaging section and the first interacting face.

7. The scooter as claimed in claim 5, wherein the first interacting face is a sloped surface, and wherein the second interacting face is a sloped surface that complements to the first interacting face.

8. The scooter as claimed in claim 1 further comprising a steering handle selectively mounted on the board for the user to grasp during operation.

9. The scooter as claimed in claim 1 wherein the at least one wheel assembly includes a connecting device and a wheel connected to the board by the connecting device.

10. The scooter as claimed in claim 9, wherein the connecting device includes an axle, two sleeves, and two fastening members, with the wheel rotatably mounted on an outer periphery of the axle, with the axle retained to the board by the two fastening members, and with sleeves connected to two opposing distal ends of the axle and disposed on an outer periphery of the axle.

11. The scooter as claimed in claim 1, wherein the actuating member is moveably disposed in a receptacle defined in the board and includes a user-interface side exposed outside an opening of the receptacle defined in the first side of the board, and an urging section engaging with an engaging section of the levering member causing the lever member to be rotated, wherein the levering member includes a first interacting face engaged with a second interacting face of the engaging member for causing the engaging member to be moved.

12. The scooter as claimed in claim 11, wherein the first interacting face is a sloped surface, and wherein the second interacting face is a sloped surface that complements to the first interacting face.

13. The scooter as claimed in claim 2 further comprising a steering handle selectively mounted on the board for the user to grasp during operation.

14. A scooter comprising:
a board for supporting a user thereof, with the board including a first side and a second side in opposition to the first side, with the user being in contact with the first side during operation;
at least one wheel assembly mounted on the board for facilitating movement and transportation of the board; and
a braking system operable in a first mode that engages with and imparts a braking force to the at least one wheel assembly for stopping the scooter, and in a second mode that is subject to a force and is caused to disengage from the at least one wheel assembly for allowing the scooter to be moved without being subject to any braking force;
wherein when the user wants to ride the scooter he/she uses his/her foot on the board to apply a force on the braking system such that the braking system is caused to operate in the first mode, and when he/she wants to stop the scooter he/she takes his/her foot off the braking system such that the braking system is caused to operate in the second mode, respectively, wherein the braking system includes an actuating member, a levering member rotatably supported about a fulcrum and rotated under a force applied to the actuating member, an engaging member selectively engaged with the at least one wheel assembly and engaged with the levering member and moved in a first direction to disengage from the at least one wheel assembly for allowing the scooter to move without being subject to any braking force as the levering member is rotated in a first rotational direction and moved in a second direction to engage with the at least one wheel assembly for stopping the scooter as the levering member is rotated in a second rotational direction, a resilient member biasing the engaging member, and a cap retained in place, with the resilient member including one of two opposing ends abutted against the engaging member and the other of the two opposing ends abutted against the cap, wherein the actuating member is moveably disposed in a receptacle defined in the board and includes a user-interface side exposed outside an opening of the receptacle defined in the first side of the board, and an urging section engaging with an engaging section of the levering member causing the lever member to be rotated, wherein the levering member includes a first interacting face engaged with a second interacting face of the engaging member for causing the engaging member to be moved, wherein the engaging section of the levering member is an arcuate surface and the urging section of the actuating member that engages with the engaging section is arcuate.

15. The scooter as claimed in claim 14 further comprising a steering handle selectively mounted on the board for the user to grasp during operation.

16. A scooter comprising:
a board for supporting a user thereof, with the board including a first side and a second side in opposition to the first side, with the user being in contact with the first side during operation;
at least one wheel assembly mounted on the board for facilitating movement and transportation of the board;
a braking system operable in a first mode that engages with and imparts a braking force to the at least one wheel assembly for stopping the scooter, and in a second mode that is subject to a force and is caused to disengage from the at least one wheel assembly for allowing the scooter to be moved without being subject to any braking force;
wherein when the user wants to ride the scooter he/she uses his/her foot on the board to apply a force on the braking system such that the braking system is caused to operate in the first mode, and when he/she wants to stop the scooter he/she takes his/her foot off the braking system such that the braking system is caused to operate in the second made, respectively, wherein the braking system includes an actuating member, a levering member rotatable supported about a fulcrum and rotated under a force applied to the actuating member, an engaging member selectively engaged with the at least one wheel assembly and engaged with the levering member and moved in a first direction to disengage from the at least one wheel assembly for allowing the scooter to move without being subject to any braking force as the levering member is rotated in a first rotational direction and moved in a second direction to engage with the at least one wheel assembly for stopping the scooter as the levering member is rotated in a second rotational direction, a resilient member biasing the engaging member, and a cap retained in place, with the resilient member including one of two opposing ends abutted against the engaging member and the other of the two opposing ends abutted against the cap; and
a retaining member fastened to the board, with the engaging member including a bottom side supported on the retaining member such that the engaging member is prevented from disengagement from the levering member, and with the levering member supported on the retaining member such that the levering member is prevented from disengagement from the actuating member and the engaging member.

17. The scooter as claimed in claim 16 further comprising a steering handle selectively mounted on the board for the user to grasp during operation.

18. A scooter comprising:
a board for supporting a user thereof, with the board including a first side and a second side in opposition to the first side, with the user being in contact with the first side during operation;
at least one wheel assembly mounted on the board for facilitating movement and transportation of the board; and
a braking system operable in a first mode that engages with and imparts a braking force to the at least one wheel assembly for stopping the scooter, and in a second mode that is subject to a force and is caused to disengage from the at least one wheel assembly for allowing the scooter to be moved without being subject to any braking force;
wherein when the user wants to ride the scooter he/she uses his/her foot on the board to apply a force on the braking system such that the braking system is caused to operate in the first mode, and when he/she wants to stop the scooter he/she takes his/her foot off the braking system such that the braking system is caused to operate in the second mode, respectively, wherein the braking system includes an actuating member, a levering member rotatably supported about a fulcrum and rotated under a force applied to the actuating member, an engaging member selectively engaged with the at least one wheel assembly and engaged with the levering member and moved in a first direction to disengage from the at least one wheel assembly for allowing the scooter to move without being subject to any braking force as the levering member is rotated in a first rotational direction and moved in a second direction to engage with the at least one wheel assembly for stopping the scooter as the levering member is rotated in a second rotational direction, a resilient member biasing the engaging member, and a cap retained in place, with the resilient member including one of two opposing ends abutted against the engaging member and the other of the two opposing ends abutted against the cap, wherein the engaging member includes a retaining section, a protuberance, and a brake section, with the retaining section engaged with the board for the engaging member to accomplish predetermined directions of movement, with the protuberance abutted against the resilient member, and with the brake section selectively engaged with the at least one wheel assembly.

19. The scooter as claimed in claim 18 further comprising a steering handle selectively mounted on the board for the user to grasp during operation.

20. A scooter comprising:
a board for supporting a user thereof, with the board including a first side and a second side in opposition to the first side, with the user being in contact with the first side during operation, wherein the board includes a structure extending from the first side to the second side and including a plurality of ribs arranged to form an array of a plurality of cells including a plurality of spaces, respectively;
at least one wheel assembly mounted on the board for facilitating movement and transportation of the board;
a braking system operable in a first mode that engages with and imparts a braking force to the at least one wheel assembly for stopping the scooter, and in a second mode that is subject to a force and is caused to disengage from the at least one wheel assembly for allowing the scooter to be moved without being subject to any braking force;
wherein when the user wants to ride the scooter he/she uses his/her foot on the board to apply a force on the braking system such that the braking system is caused to operate in the first mode, and when he/she wants to stop the scooter he/she takes his/her foot off the braking system such that the braking system is caused to operate in the second mode, respectively, wherein the braking system includes an actuating member, a levering member rotatably supported about a fulcrum and rotated under a force applied to the actuating member, an engaging member selectively engaged with the at least one wheel assembly and engaged with the levering member and moved in a first direction to disengage from the at least one wheel assembly for allowing the scooter to move without being subject to any braking force as the levering member is rotated in a first rotational direction and moved in a second direction to engage with the at least one wheel assembly for stopping the scooter as the levering member is rotated in a second rotational direction, a resilient member biasing the engaging member, and a cap retained in place, with the resilient member including one of two opposing ends abutted against the engaging member and the other of the two opposing ends abutted against the cap; and
a retaining member fastened to the board, with the engaging member including a bottom side supported on the retaining member such that the engaging member is prevented from disengagement from the levering member, and with the levering member supported on the retaining member such that the levering member is prevented from disengagement from the actuating member and the engaging member.

* * * * *